No. 717,268. Patented Dec. 30, 1902.
C. D. POUILLE.
SEEDING MACHINE.
(Application filed July 1, 1902.)
(No Model.)
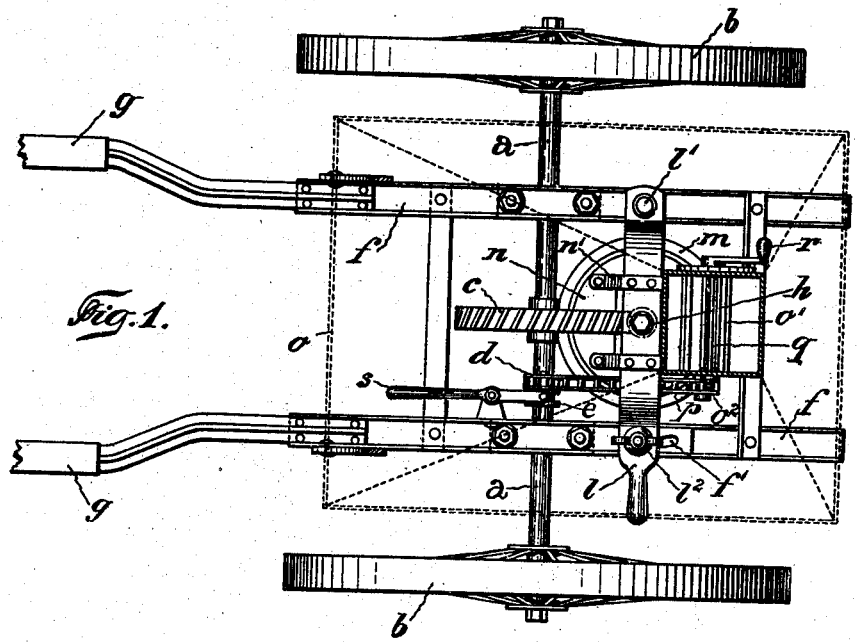
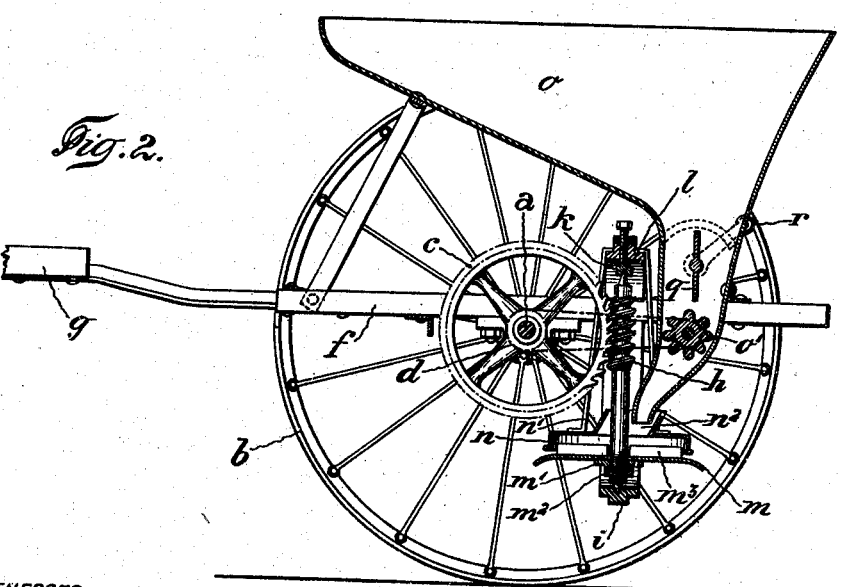
WITNESSES:
Henry Suhrbier.
Konrad Zimmer.
INVENTOR
Charles Désiré Pouille
BY Goepel & Niles
ATTORNEYS.

UNITED STATES PATENT OFFICE.

CHARLES DÉSIRÉ POUILLE, OF VERSOIX, SWITZERLAND.

SEEDING-MACHINE.

SPECIFICATION forming part of Letters Patent No. 717,268, dated December 30, 1902.

Application filed July 1, 1902. Serial No. 113,897. (No model.)

*To all whom it may concern:*

Be it known that I, CHARLES DÉSIRÉ POUILLE, engineer, a citizen of the Republic of Switzerland, residing in Versoix, canton of Geneva, Switzerland, have invented certain new and useful Improvements in and Relating to Seeding-Machines, of which the following is a specification.

This invention relates to a broadcast seeder or fertilizer-distributer; and its object is to provide a device of this character with means whereby a draft of air is generated by the action of members of the apparatus, and the force of the draft is utilized in addition to the centrifugal force of the rotating distributing-disk, so as to effectually scatter the seed or fertilizer over a large area.

To this end the invention consists of a seeder or fertilizer-distributer comprising a carriage, a hopper supported thereon, a rotatable distributing-disk, a hood supported thereover, and means for adjusting said disk relatively to the hood, said hood being provided with a central opening or mouth for communicating with the throat of said hopper and for permitting the ingress of air, as will be more fully described hereinafter and finally pointed out in the claims.

In the accompanying drawings, Figure 1 is a plan view of my improved seeder or fertilizer-distributer with the hopper indicated by dotted lines, and Fig. 2 is a central vertical section longitudinally of the apparatus.

Similar letters of reference indicate corresponding parts.

Referring to the drawings, the carriage for the distributing mechanism consists of an axle-shaft $a$, wheels $b$, rotatable therewith, a supporting-frame $f$, secured on the axle-shaft, and thills $g$, formed as a portion of the frame. Centrally on the shaft $a$ is keyed a gear-wheel $c$, which is adapted to be thrown into mesh with a worm $h$. Adjacent to the gear-wheel $c$ is loosely mounted on the shaft $a$ a shiftable collar $e$, which is actuated or shifted by a hand-lever $s$, so as to feather on the shaft and revolve therewith or be shifted laterally to permit the axle-shaft $a$ to revolve independently thereof, said collar $e$ being formed with a sprocket $d$. Transversely of the frame $f$ and in a tangential plane to said gear-wheel $c$ is pivotally secured to a side portion of the frame $f$ a swinging frame for carrying the vertically-disposed worm $h$. This worm is supported in a step-bearing of the bottom portion $i$ of said swinging frame, while its upper end is secured in a bearing $k$ of the upper portion $l$ of the swinging frame. This frame is pivoted adjacent to one of the upper corners at $l'$ to the carriage-frame $f$ and is adapted to swing about the pivot $l'$ as a center, and at the other upper corner is provided a bolt and thumb-nut $l^2$, said bolt being adapted to move in a slot $f'$ of the carriage-frame $f$. The slot $f'$, containing the bolt $l^2$, limits the swinging action of the worm-carrying frame sufficiently to permit the worm $h$ to be moved into and out of mesh with the gear-wheel $c$.

A horizontal distributing-disk $m$ is provided on the lower screw-threaded end of the shaft of the worm $h$, and the same may be adjusted vertically by means of a nut $m'$ and a counter-nut $m^2$. Upon the upper surface of the disk $m$ is provided a plurality of radial blades $m^3$ for facilitating the throwing off of the seed or fertilizer when the disk rotates. Over the disk $m$ is supported a circular hood $n$, having its lower edge in proximity to the outer edge of the disk and the upper surface thereof, so as to provide an annular outlet between the same. The hood is secured at the lower ends of supports $n'$, which are provided on the upper portion $l$ of the transverse frame, and the central part of the hood is formed with a tubular mouth $n^2$, through which the shaft of the worm $h$ extends and into which the throat of the hopper $o$ projects. This mouth also affords an entrance for air, and by the rotation of the disk $m$ the blades create a considerable draft, which contributes with the centrifugal force of said disk to distribute the seed or fertilizer. The circular opening between the lower edge of the hood $n$ and the upper surface of the disk $m$ can be regulated according to the nature of the seed as being large or small or the fertilizer as being coarse or fine, the disk being regulated by means of the nuts $m'$ $m^2$.

The hopper $o$ is provided with an elongated throat in which is arranged a regulator $q$, in the nature of a damper, to control the rate of feed from the hopper, and at one end of the regulator is provided a handle $r$ exterior of the hopper and having a suitable rack-and-pawl device for setting the regulator at any desired angle. Below the regulator $q$ is mounted transversely of the throat of the hopper a feed-roll $o'$, which permits the steady feeding of the seed or fertilizer through the throat. At one end of the feed-roll $o'$ a sprocket $o^2$ is connected by a sprocket-chain $p$ with the sprocket $d$ of the collar $e$.

By swinging the transverse worm-carrying frame to the rearward the worm $h$ is moved out of mesh with the gear-wheel $c$, and by shifting the collar $e$, having the sprocket $d$, the seeder can be wheeled or transported from one place to another without the working mechanism being operated. When it is desired to place the apparatus in operative condition, the worm $h$ is thrown into engagement with the gear-wheel, and the sprocket $d$, with the collar $e$, is caused to feather on the axle-shaft $a$ by operating the hand-lever $s$, so that when the seeder is moved the axle-shaft turns with the wheel $b$, causing the feed-roll to turn and the distributing-disk to rotate through the worm $h$ and the gear-wheel $c$. The rotation of the disk $m$ generates a draft of air that is drawn in through the mouth $n^2$ of the hood and passes out of the circular space between the lower edge of the hood and the disk with considerable force, so as to act as a blower to facilitate the distributing of the seed or fertilizer by the centrifugal force of the rotating distributing-disk.

It is well known that seeders or fertilizer-distributers have been made with the rotating-disk distributer; but the construction which generates a current of air as an auxiliary distributing agent is the novel feature of the present invention.

Having thus described my invention, I claim as new and desire to secure by Letters Patent—

1. In a seed-distributer, the combination of a rotatable distributing-disk, blades on the same, a hood for said disk provided with a mouth, and a hopper having the throat thereof projecting into said mouth, said hood and disk being arranged relatively to each other to form a blower, substantially as set forth.

2. In a seed-distributer, the combination of a rotatable distributing-disk, blades on the same, a hopper having a contracted throat, a hood arranged over said disk having a central air-inlet mouth, the mouth receiving the lower end of the throat of said hopper, and means for regulating the space between the lower edge of said hood and disk, substantially as set forth.

In testimony that I claim the foregoing as my invention I have signed my name in presence of two subscribing witnesses.

CHARLES DÉSIRÉ POUILLE.

Witnesses:
E. IMER-SCHNEIDER,
L. H. MUNIER.